May 12, 1970    W. B. FEHRING ETAL    3,511,456
STAGGERED FOUR TRUCK MAIN LANDING GEAR FOR HEAVY AIRCRAFT
Filed April 24, 1969    3 Sheets-Sheet 1

INVENTORS:
WENDELL B. FEHRING
FRIEDRICH W. SCHERER
DONALD K. WIKA
BY
Theron H. Nichols
AGENT May 12, 1970    W. B. FEHRING ETAL    3,511,456
STAGGERED FOUR TRUCK MAIN LANDING GEAR FOR HEAVY AIRCRAFT
Filed April 24, 1969    3 Sheets-Sheet 3

INVENTORS:
WENDELL B. FEHRING
FRIEDRICH W. SCHERER
DONALD K. WIKA
BY
Theron H. Nichols
AGENT

United States Patent Office 3,511,456
Patented May 12, 1970

3,511,456
STAGGERED FOUR TRUCK MAIN LANDING GEAR FOR HEAVY AIRCRAFT
Wendell B. Fehring, Issaquah, Friedrich W. Scherer, Federal Way, and Donald K. Wika, Seattle, Wash., assignors to The Boeing Company, Seattle, Wash., a corporation of Delaware
Continuation-in-part of application Ser. No. 630,901, Apr. 14, 1967. This application Apr. 24, 1969, Ser. No. 818,891
Int. Cl. B64c 25/10
U.S. Cl. 244—102
5 Claims

ABSTRACT OF THE DISCLOSURE

A staggered main landing gear is disclosed for the large type of aircraft weighing over 700,000 pounds, comprising two fuselage mounted coaxial aft units or wheel trucks equally spaced on opposite sides of the aircraft longitudinal axis and two wing mounted fore wheel units or wheel trucks being equally spaced transversely a greater distance from the aircraft longitudinal axis than the aft units, the aft wheel units being retractable forwardly and upwardly into a wheel well in the center of the fuselage and both fore units being retractable in an angular direction forwardly, inwardly, and upwardly to a position contiguous with the aft wheel units or into the same wheel well therewith to provide the structurally lightest four strut main landing gear for the required footprint area and requiring the least space for retraction thereof.

CROSS-REFERENCES TO RELATED APPLICATIONS

This invention is a continuation-in-part of our application Ser. No. 630,901, now abandoned, filed Apr. 14, 1967, by Wendell B. Fehring, Friedrich W. Scherer, and Donald K. Wika.

SUMMARY OF THE INVENTION

The disclosed invention is a retractable and staggered main landing gear comprising a minimum of four units, each unit of wheels being supported by a strut. In this four unit landing gear two coaxial, closely spaced apart, aft units are mounted on the fuselage on opposite sides of the longitudinal axis for forward retraction. Two fore landing gear units are retractably mounted under the wings forwardly of the aft units and equally spaced transversely from the longitudinal axis. The fore units are spaced apart transversely from each other a greater distance than the aft units are spaced apart to provide a light, retractable main landing gear having a maximum footprint area.

The aft landing gear units are retractable forwardly and upwardly into a central wheel well and the two fore landing gear units are each retractable forwardly, inwardly, and upwardly to a position contiguous with the aft landing gear units or into the same wheel well for a great saving in space.

The support of large aircraft with lighter landing gears and supporting structure is a mammoth engineering problem, particularly as aircraft get larger and stronger, and heavier support beams are required in the wings and fuselage to connect to and support the landing gear struts.

Likewise in large aircraft, the storage of the supporting landing gear is a great problem, particularly when space is so valuable and weight is so critical. Every pound saved in aircraft structure and every cubic foot of space made available means a gain in over a thousand dollars in revenue over the life of the aircraft.

Accordingly, a principal object of this invention is to provide a four unit main landing gear for a heavy aircraft that provides the shortest load path for shock strut attachment to the aircraft basic structure or which obviates the necessity of additional large, heavy landing gear support structure.

Another principal object is to provide a four unit main landing gear which is retractable to a position contiguous with each other or into a single wheel well and extendible from the compact wheel well to provide a wide, stable footprint area and a great saving in space.

Other objects and various advantages of the disclosed aircraft staggered landing gear will be apparent from the following detailed description, together with the accompanying drawings submitted for purposes of illustration only.

BRIEF DESCRIPTION OF FIGURES

The drawings diagrammatically illustrate by way of example, not by way of limitation, one form of the invention wherein like reference numerals designate corresponding parts in the several views in which.

DESCRIPTION OF THE PREFERRED EMBODIMENT

The invention is not limited in its application to the details of construction and arrangement of parts shown and described, since the invention is capable of other embodiments and of being practiced or carried out in various other ways. Also it may be noted that the phraseology or terminology employed herein is for the purpose of description and not of limitation.

Figure 1:
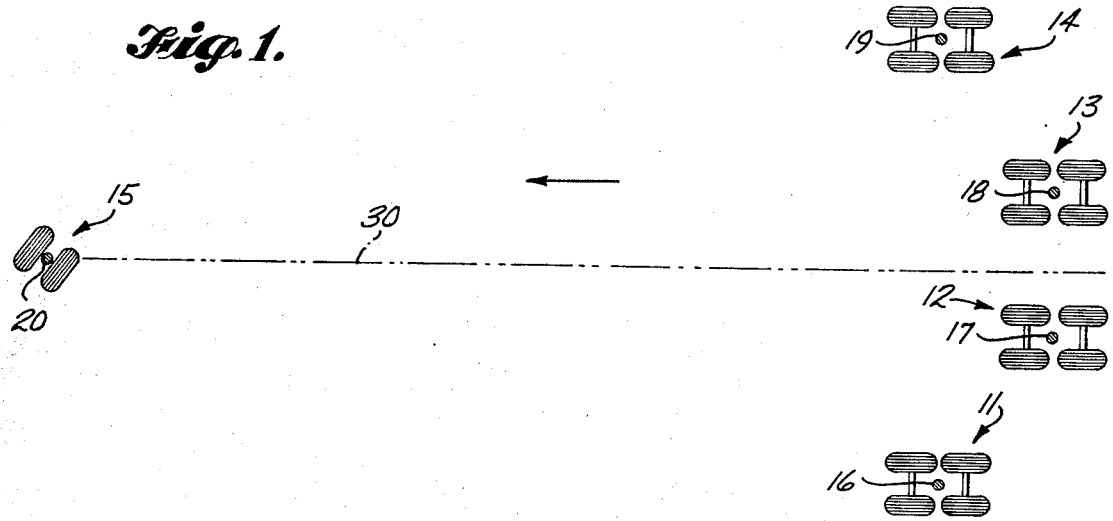
FIG. 1 is a plan view of the preferred embodiment of the new staggered landing gear illustrating, particularly, the position of the wheel trucks relative to each other.

FIG. 1 illustrates, in plan form, the preferred embodiment of the disclosed aircraft landing gear, showing in particular, the staggered main landing gear 10, comprising four units or trucks of wheels, 11, 12, 13, and 14, and a steerable nose gear truck, 15, each truck having oleo struts, 16, 17, 18, 19, and 20, respectively. While the left landing gear units are shown in greater detail than the right landing gear units, the complete right aft landing gear unit 13 including the truck, oleo strut 18, retracting actuator, and pivotal connections to the aircraft described hereinafter is the allochiral analogue of the left aft landing gear unit 12. Likewise, the complete right fore landing gear unit 14 is the enantiomorphic analogue of the left fore landing gear unit 11.

As shown in FIG. 1, the aft wheel units or trucks 12 and 13 are substantially coaxial and may be either as close to each other as possible without producing any interference or the two units may be spaced apart the maximum distance permitted with the main landing gear struts 17 and 18 still being pivotally connected to the fuselage main keel beam.

A problem in the design of large aircraft, such as those disclosed in but not limited to, assignee's Pats. 2,659,555 to Schlender, 3,244,385 to Fehring et al., 3,285,541 to Fehring et al., and Design Pat. 202,749 to Holtby et al., and other aircraft weighing over 700,000 pounds is the provision or design of a landing gear that is large enough to provide the required footprint area or flotation capabilities and yet of the lightest possible structure. Aircraft of this size require a minimum of four main landing gear units or four-wheel trucks wherein each truck is of the size of each of the two present day four-wheel trucks used to support 300,000 pound aircraft. The disclosed staggered main landing gear is a novel aircraft landing gear not shown or used by any other large four main landing gear aircraft.

The new and unobvious results of our invention, the staggered landing gear of FIGS. 1 through 4 amounts to two basic features.

Figure 3:
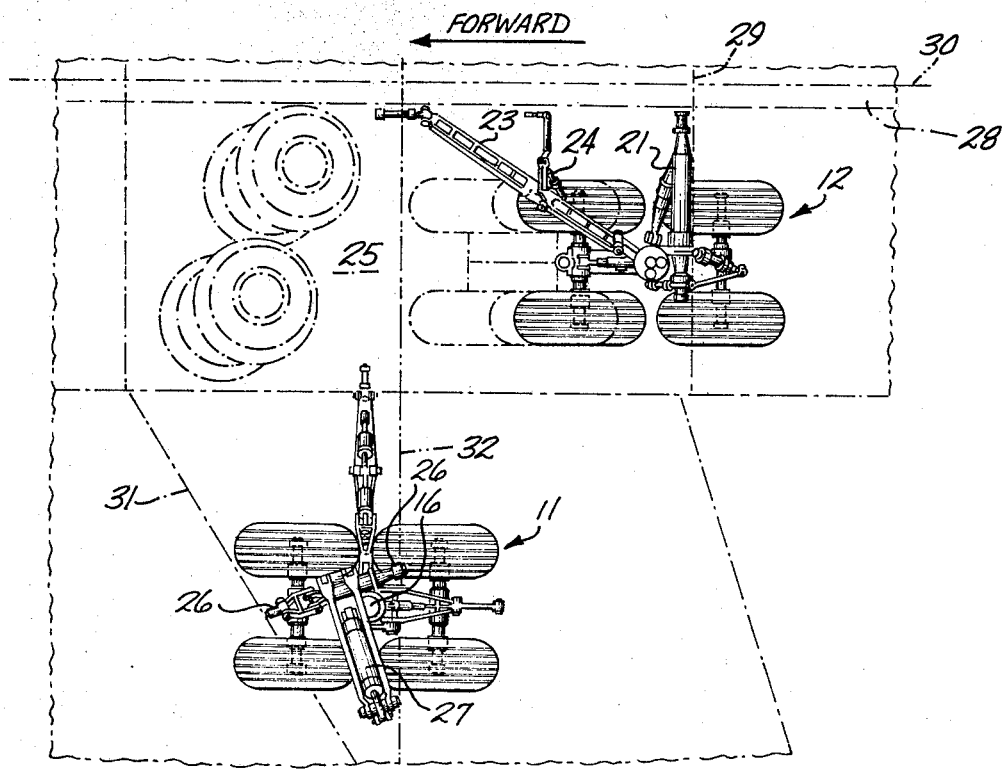
FIG. 3 is a top view of the left main landing gear of FIG. 1 shown extended in solid lines, and with the retracted wheels and adjacent portion of the aircraft structure shown in broken lines.

One, this particular pattern of landing gear units has struts, as clearly illustrated in FIGS. 1 and 3, which pattern requires much less connecting structure between the main structure of the aircraft and the main landing gear struts. Thus each of the two fuselage mounted, inner, or aft landing gear struts 17 and 18 are connectable directly to the fuselage main keel beam 28 and adjacent aft bulkhead 29 (only struts 17 being illustrated in FIG. 3) as far aft as permitted by the aircraft CG (center of gravity). Likewise, each of the two wing mounted, outer, or fore landing gear struts of the staggered configuration are connectable directly to the wing rear spars (FIG. 3 illustrating only fore strut 16 connected directly to the wing rear spar 31 and adjacent landing gear beam 32). Otherwise, if the wing or outer landing gear struts were located anywhere else, additional struts, braces, trusses, and reinforcing structure would be required to connect the landing gear struts to the aircraft wing main spars to support its portion of the 700,000 pound load. Likewise, if the aft landing gear struts are located other than on the fuselage, as on the wing for example, the conventional mounting, then the wings must be strengthened to ensure absorption of all landing loads in addition to the flight loads.

Two, this particular pattern of landing gear units provides and ensures that the four trucks are retractable into a contiguous position with each other or into the same wheel well providing a great saving and reduction in the amount of wheel well space required in the aircraft.

FIG. 1 illustrates the staggered position of the two fore landing gear units 11 and 14, relative to the aft units 12 and 13, respectively. The oleo struts 16 and 19 of the forward main wheel units or trucks 11 and 14, respectively are pivotally connected to the wing main spars as disclosed in FIG. 3 and few, if any, longitudinal and cross braces are required, and a minimum amount of support structure is required. Thus, a light and wide footprint area is provided.

MAIN LANDING GEAR AFT UNITS

Figure 2:
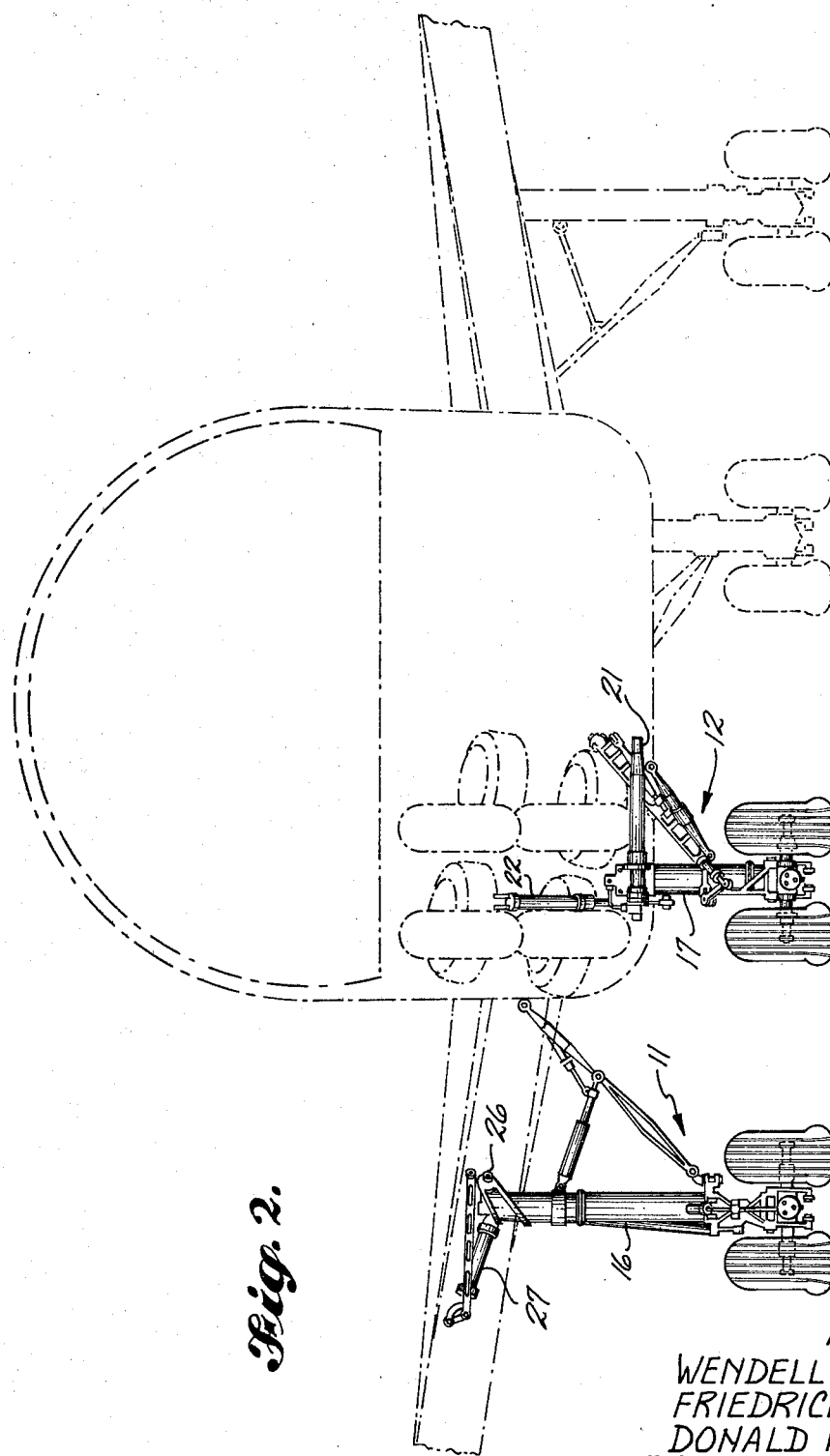
FIG. 2 is a rear view looking forward of the main landing gear of FIG. 1 illustrating the position of the wheels relative to each other, the extended left main landing gear being shown in solid lines, and the extended right main landing gear, the airplane, and the retracted wheels of the left main landing gear being illustrated in broken lines for clarity of disclosure.
Figure 4:
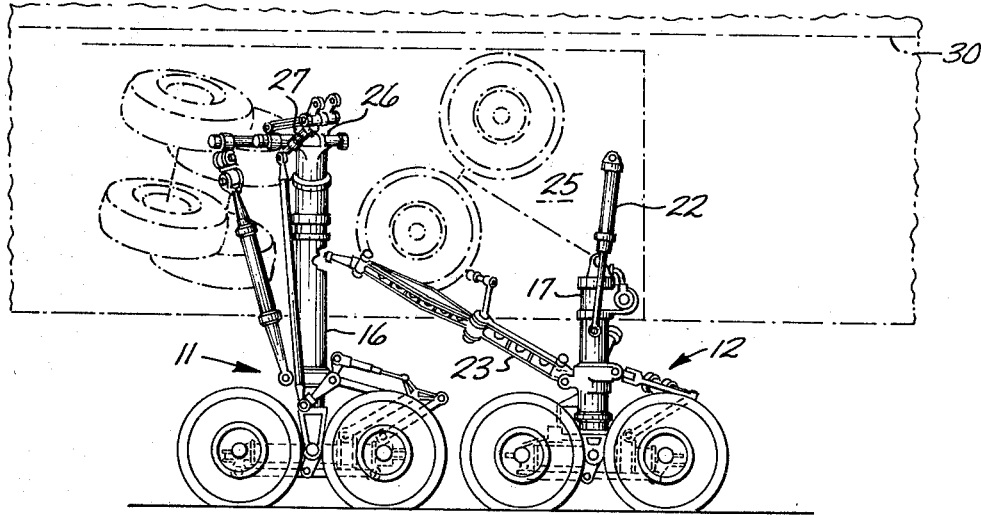
FIG. 4 is a side view of FIG. 3.

Details of each landing gear unit and truck per se are disclosed in the remainder of the FIGS. 2-4, wherein the trunnion support 21, FIG. 3, mounted in the fuselage keel beam 28 and adjacent bulkhead 29 of one of the two aft allochiral landing gear trucks pivotally supports the aft truck 12 for retraction by a conventional retracting strut 22, FIGS. 2 and 4, after folding drag strut 23, FIGS. 3 and 4, is broken or partially collapsed by a conventional actuator 24, FIG. 3. The right aft landing gear unit 13 retracts similarly, both units retracting forwardly into the single wheel well 25 and both aft units being equally spaced from the aircraft longitudinal axis 30.

MAIN LANDING GEAR FORE UNITS

As illustrated in FIG. 1, the fore landing gear units 11 and 14 are positioned forwardly and outwardly in a staggered position from the respective aft landing gear units 12 and 13, providing a large footprint area, unit 11 likewise being the allochiral analogue of unit 14. Because of the staggered feature of the disclosed main landing gear, the oleo struts 16 and 19, FIG. 1, of the landing gear units 11 and 14, respectively, are accordingly pivotally connected directly to the left and right wing rear spars, only spar 31, FIG. 3, on the left wing for landing gear strut 16 being illustrated. Trunnion support or canted pivot means 26, FIGS. 2-4, in the left wing main spar and adjacent landing gear beam 32 pivotally connects the left forward landing gear unit oleo strut 16, FIGS. 2 and 4, for example, for retraction of the unit to a position contiguous with the retracted aft units or into the single wheel well 25, FIGS. 3 and 4.

As seen in FIGS. 2-4, a conventional retracting actuator 27 swings the left fore truck of wheels forwardly, upwardly, and inwardly relative to the aircraft longitudinal axis into the wheel well 25, FIGS. 3 and 4. Both fore landing gear units likewise are equally spaced about the aircraft longitudinal axis 30.

In the above described embodiment, steering of the aircraft by turning of the various wheels may be accomplished by any suitable means. Such a steering mechanism is disclosed in patent application Ser. No. 655,819 filed July 25, 1967, by Friedrich W. Scherer.

Accordingly, a retractable main landing gear for aircraft of more than 700,000 pounds is disclosed for providing a larger footprint area, for providing the shortest load path for shock strut attachment to the aircraft basic structure and thereby being of lighter weight due to less structural weight required, and for providing that all trucks of the main landing gear are retractable to a position contiguous with each other or in a single wheel well for increased space saving.

While only one embodiment of the invention has been disclosed, it will be evident that various other modifications are possible in the arrangement and construction of the disclosed aircraft staggered landing gear and it is accordingly desired to comprehend within the purview of this invention such modifications as may be considered to fall within the appended claims.

We claim:
1. In combination with a large aircraft having a fuselarge and wings extending therefrom, a staggered main landing gear comprising,
   (a) two fuselage mounted aft landing gear means for said fuselage being adjacent to the aircraft longitudinal axis,
   (b) two wing mounted fore landing gear means positioned forwardly and outwardly of said aft landing gear means to provide a light main landing gear having the maximum width and load carrying footprint area, and
   (c) all of said aft landing gear means and said fore landing gear means having retracting means and being retractable to a position contiguous with each other in said aircraft for requiring the least aircraft space for all of said retracted main landing gear means.

2. A main landing gear as recited in claim 1 wherein,
   (a) each said aft landing gear means comprising a landing gear truck means of wheels, both of said wheel truck means being equally spaced on opposite sides of the longitudinal axis of said aircraft.

3. A main landing gear as recited in claim 2 wherein,
(a) both of said aft landing gear wheel truck means are retractable forwardly and upwardly into said fuselage.

4. A main landing gear as recited in claim 3 wherein,
(a) each of said fore landing gear means comprises a truck means of wheels mounted on a canter pivot means,
(b) said fore retracting means being responsive to said canted pivot means for retracting said fore landing gear wheel truck means forwardly, inwardly, and upwardly into said fuselage to a position contiguous with said aft landing gear wheel truck means.

5. A main landing gear as recited in calim 4 wherein,
(a) said aircraft has a single wheel well in said fuselage, and
(b) each of said landing gear truck means of wheels being responsive to its retracting means for being retractable into said single wheel well whereby a minimum of aircraft space is required for said retracted landing gear.

References Cited

UNITED STATES PATENTS

| | | | |
|---|---|---|---|
| 2,577,385 | 12/1951 | Troendle | 244—102 |
| 3,244,385 | 4/1966 | Fehring et al. | 244—102 |

FOREIGN PATENTS

| | | |
|---|---|---|
| 510,164 | 7/1939 | Great Britain. |

MILTON BUCHLER, Primary Examiner

P. E. SAUBERER, Assistant Examiner